United States Patent
Hartnagel et al.

(10) Patent No.: US 11,473,610 B2
(45) Date of Patent: Oct. 18, 2022

(54) RATCHETING SECONDARY LOCKING FEATURE

(71) Applicants: Rolls-Royce North American Technologies Inc., Indianapolis, IN (US); Rolls-Royce Corporation, Indianapolis, IN (US)

(72) Inventors: Brett Hartnagel, Brownsburg, IN (US); Ryan C. Humes, Indianapolis, IN (US); David C. Farnum, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 514 days.

(21) Appl. No.: 16/684,931

(22) Filed: Nov. 15, 2019

(65) Prior Publication Data

US 2021/0148398 A1    May 20, 2021

(51) Int. Cl.
  *F16B 39/28*     (2006.01)
(52) U.S. Cl.
  CPC .................................. *F16B 39/28* (2013.01)
(58) Field of Classification Search
  CPC .......... F16B 39/08; F16B 39/10; F16B 39/28; F16B 39/286; F16B 39/32; Y10T 403/60; Y10T 403/602; Y10S 411/95; Y10S 411/949
  USPC ........ 403/326, 327; 411/190, 204, 205, 326, 411/327, 335
  See application file for complete search history.

(56) References Cited

U.S. PATENT DOCUMENTS

| | | | | |
|---|---|---|---|---|
| 3,291,510 A | * | 12/1966 | Kody | F16L 19/086 285/348 |
| 3,633,944 A | * | 1/1972 | Hamburg | F16L 19/086 439/321 |
| 3,991,908 A | * | 11/1976 | Thomas | B65D 83/0409 221/265 |
| 4,090,545 A | * | 5/1978 | Ritter, Jr. | F16B 39/04 411/209 |
| 4,863,328 A | * | 9/1989 | Malek | A61H 33/6063 285/82 |
| 5,573,311 A | * | 11/1996 | Clohessy | F16C 35/063 301/124.1 |

(Continued)

*Primary Examiner* — Roberta S Delisle
(74) *Attorney, Agent, or Firm* — Crowell & Moring LLP

(57) ABSTRACT

An anti-rotation device for a pair of threaded components includes a pair of ratchet interfaces and a spring element. A first ratchet interface and the spring element are movably disposed within a first threaded component, and a second ratchet interface is disposed at a mating end of a second threaded component. During relative rotation of the pair of threaded components, the ratchet interfaces engage, providing a resistance to the threaded components loosening that is greater than a resistance that the ratchet interfaces provide to the threaded components tightening. The anti-rotation device engages automatically upon relative rotation of the threaded components, and not as a separate step occurring after rotation. Additionally, the anti-rotation device may be especially useful in systems where various types of movement can cause the threaded components to loosen, and where visual access to the anti-rotation device is impeded.

18 Claims, 7 Drawing Sheets

(56) References Cited

U.S. PATENT DOCUMENTS

| | | | |
|---|---|---|---|
| 9,771,962 B2* | 9/2017 | Metten | F16B 5/0283 |
| 10,107,326 B2 | 10/2018 | Wilson | |
| 2009/0199494 A1* | 8/2009 | Lee | B25B 23/00 |
| | | | 52/126.6 |
| 2009/0311041 A1* | 12/2009 | Sockman | A46D 3/08 |
| | | | 403/348 |
| 2010/0290857 A1 | 11/2010 | Smolarek et al. | |
| 2014/0017028 A1 | 1/2014 | McKinlay | |
| 2015/0078862 A1* | 3/2015 | Zhu | F16B 5/0233 |
| | | | 411/384 |
| 2015/0316087 A1* | 11/2015 | Hyzin | H02G 3/0691 |
| | | | 403/327 |
| 2017/0343034 A1* | 11/2017 | Zollmann | F16B 39/04 |

* cited by examiner

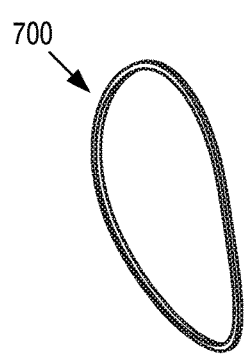
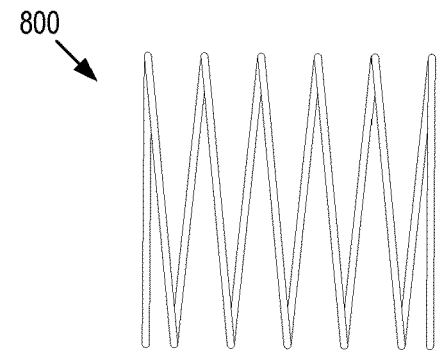
FIG. 7        FIG. 8
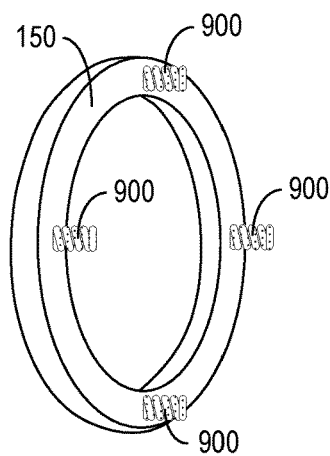
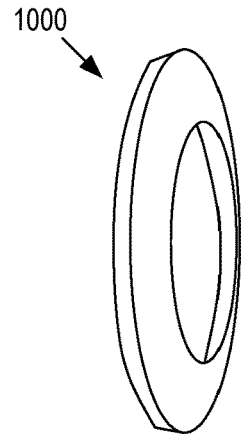
FIG. 9        FIG. 10
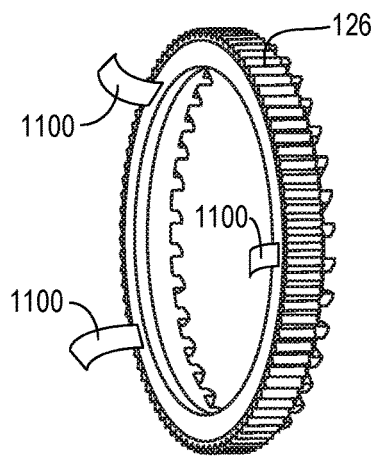
FIG. 11

RATCHETING SECONDARY LOCKING FEATURE

TECHNICAL FIELD

This disclosure relates to threaded components and, in particular, to threaded components with anti-rotation features.

BACKGROUND

Various systems may include certain components that are interlocked or otherwise connected together using threads. Such systems may have two components that have matching or complimentary threaded surfaces such that, upon engagement, rotation of one component relative to the other component in a tightening or engagement direction axially moves the two components closer together, increasing a number of threaded rotations that are engaged with each other. Additionally, rotation of one component relative to the other component in an opposite, loosening or disengagement direction axially moves the two components apart from one another, decreasing the number of threaded rotations that are engaged with one another. Example threaded components include fasteners, such as nuts, bolts, screws, and so forth.

Certain types of such systems have moving parts during operation, and/or experience certain types of movement, such as shaking, oscillation, or vibration, within the environments in which they operate. A non-limiting example of such a system is a gas turbine engine. During assembly of such systems, two threaded components may be interlocked or fastened together by a certain desired amount, such as by having been relatively rotated a certain number of times and/or by having a certain number of threads interlocked together. During operation (or at least post-assembly), it is desired for the two threaded components to maintain their amount of interlock. In actuality however, the movement experienced by the system may cause the components to undesirably rotate in the loosening direction, in turn weakening the interlock between the components, or causing the components to separate altogether.

To prevent undesirable loosening rotation, such systems may include anti-rotation or locking mechanisms, also called secondary locking mechanisms, combined with the threaded components. Existing anti-rotation mechanisms include cuplock washers that are dimpled down into threaded components prone to loosening, such as nuts. Such existing anti-rotation mechanisms require an extra assembly step, and also require visual confirmation that the anti-rotation mechanism has been properly configured and/or assembled. Other existing anti-rotation mechanisms include elastomeric inserts and deformed threads. Elastomeric inserts can be deficient because they experience performance degradation at higher temperature. Deformed threads can be deficient because they often have limited life cycles or usage limitations.

In various systems, such as gas turbine engines, the threaded components are in locations, and/or have configurations, for which visual confirmation that the anti-rotation mechanism has been properly configured cannot be made, rendering anti-rotation mechanisms that require visual confirmation undesirable. Accordingly, an anti-rotation mechanism that can be properly configured without the need for visual access or confirmation, that can be properly configured during relative rotation of the threaded components without the need for an extra step, and/or that does not have temperature and/or usage limitations as mentioned above is desirable.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 7 illustrates a perspective view of the spring element configured as a wave spring.

FIG. 8 illustrates a side view of the spring element configured as a single coil spring.

FIG. 9 illustrates a perspective view of the spring element configured as a plurality of coil springs circumferentially positioned around an inner shoulder of the first threaded component.

FIG. 10 illustrates a perspective view of the spring element configured as a Belleville washer.

FIG. 11 illustrates a perspective view of the spring element configured as a plurality of elastic fingers projecting from the first ratchet interface.

DETAILED DESCRIPTION

The present description describes an anti-rotation device integrated with a pair of threaded components that are configured to threadingly engage with each other. The anti-rotation device may be configured in one of two states at a given point in time, including an engaged state and a disengaged state. In the engaged state, the anti-rotation device is configured to exert an anti-loosening resistance to relative rotation of the threaded components in a loosening direction that is greater than an anti-tightening resistance it exerts to relative rotation of the threaded components in a tightening direction. The anti-loosening resistance may be greater than a maximum rotational force in the loosening direction that the threaded components would be subjected to due to movement, such as vibration, during operation of a system in which the threaded components and the anti-rotation device are implemented, in order to prevent undesired loosening of the threaded components. In the disengaged state, the anti-rotation device does not exert an anti-loosening or an anti-tightening resistance to relative rotation of the threaded components.

Figure 1A:
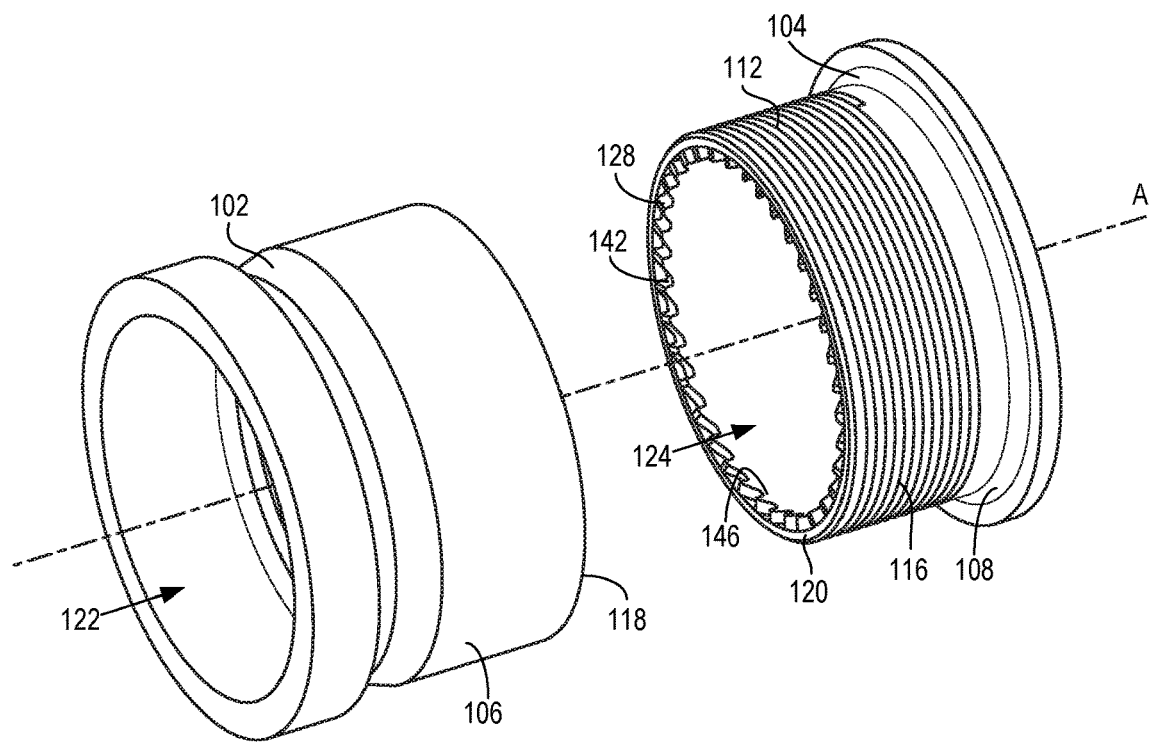
FIG. 1A illustrates a perspective view of a pair of threaded components, integrated with an anti-rotation device, where the threaded components are separated from each other.
Figure 1B:
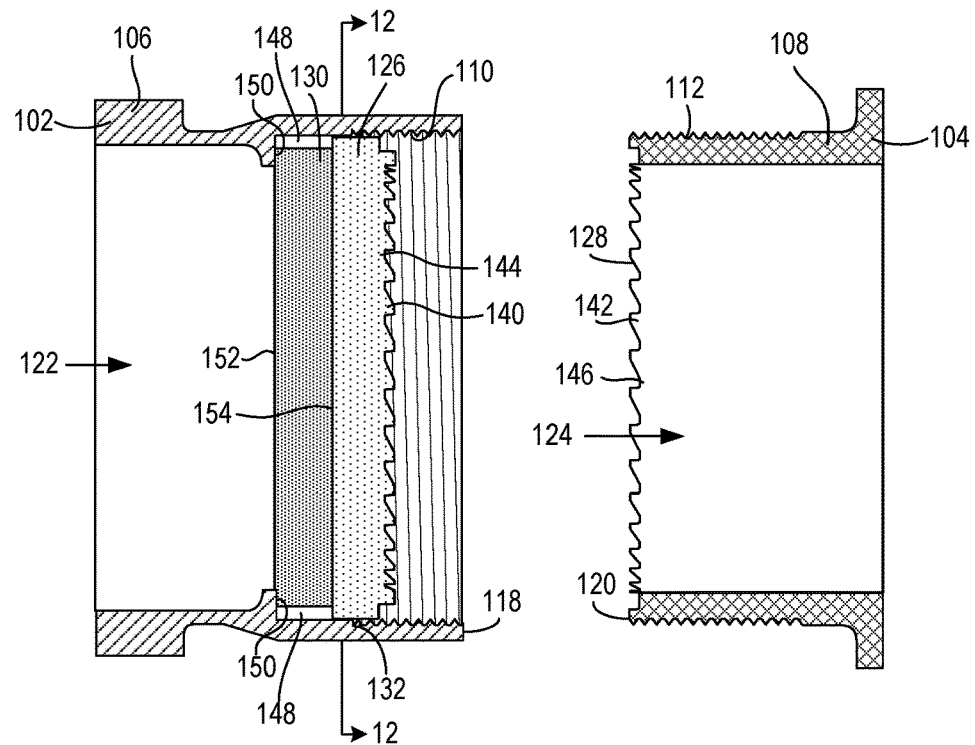
FIG. 1B illustrates a partial cross-sectional view of the threaded components positioned in FIG. 1A.
Figure 2A:
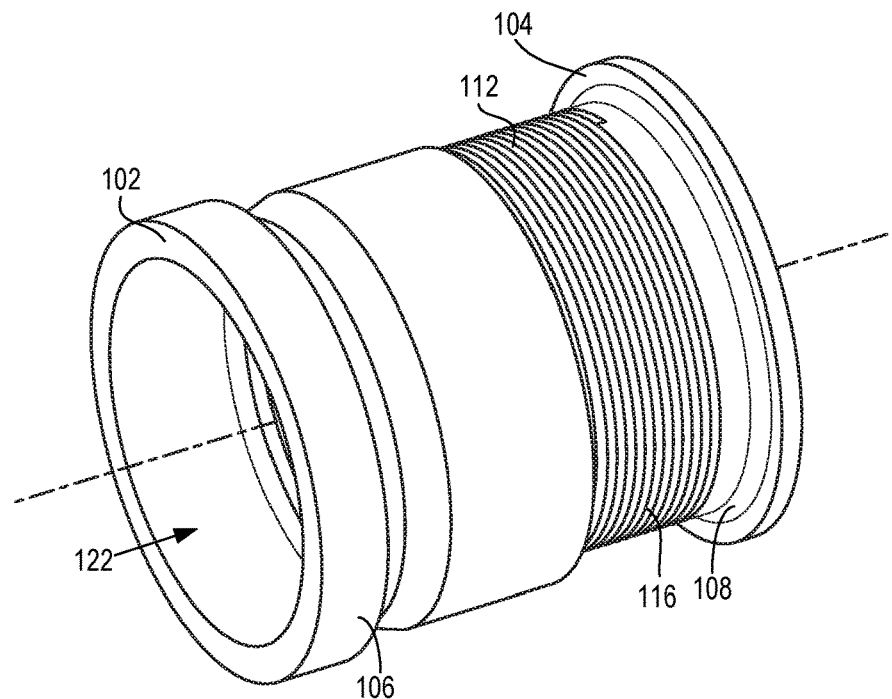
FIG. 2A illustrates a perspective view of an initial engagement of the pair of threaded components of FIGS. 1A and 1B, with the anti-rotation device disengaged.
Figure 2B:
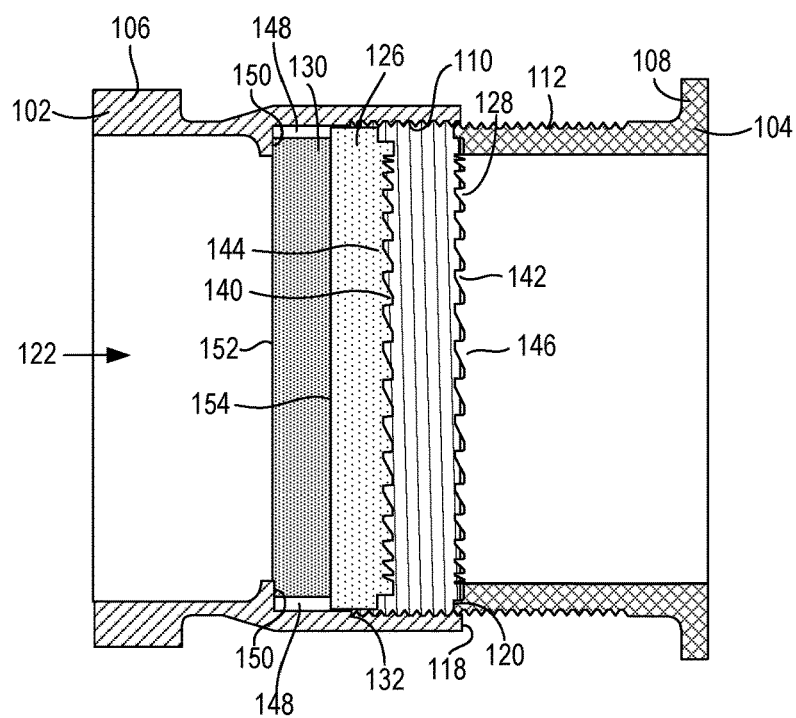
FIG. 2B illustrates a partial cross-sectional view the threaded components positioned in FIG. 2A.
Figure 3A:
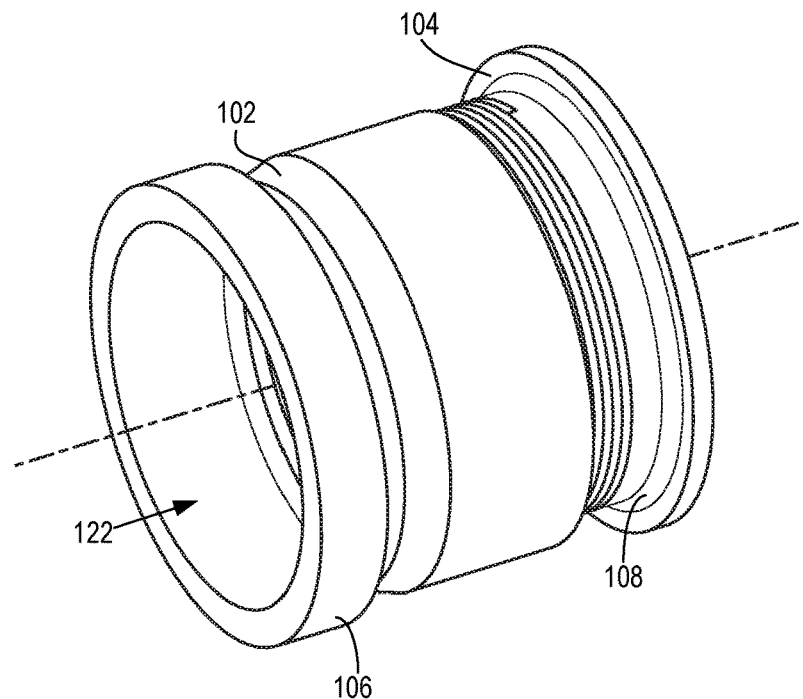
FIG. 3A illustrates a perspective view of the pair of threaded components having engaged and relatively rotated, with ratchet interfaces of the anti-rotation device engaged and a spring element partially compressed.
Figure 3B:
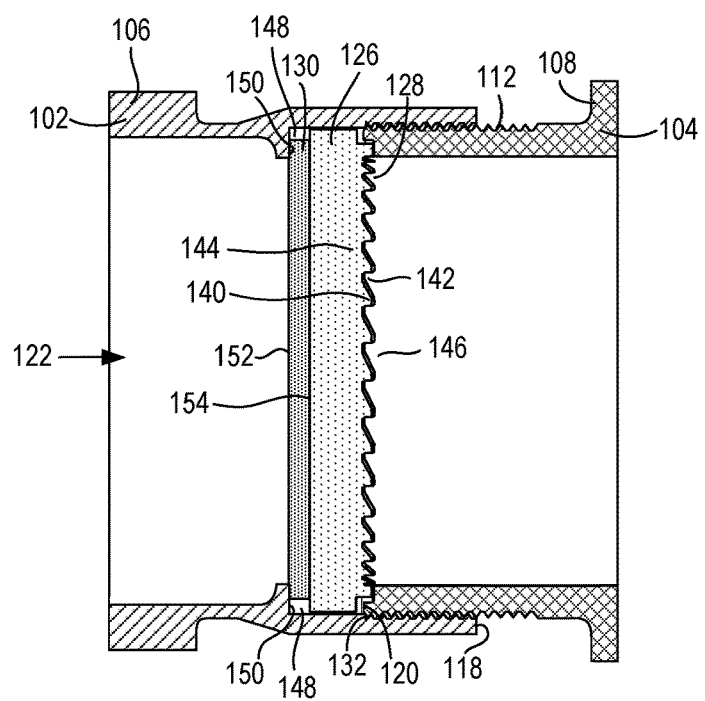
FIG. 3B illustrates a partial cross-sectional view of the threaded components positioned in FIG. 3A
Figure 4:
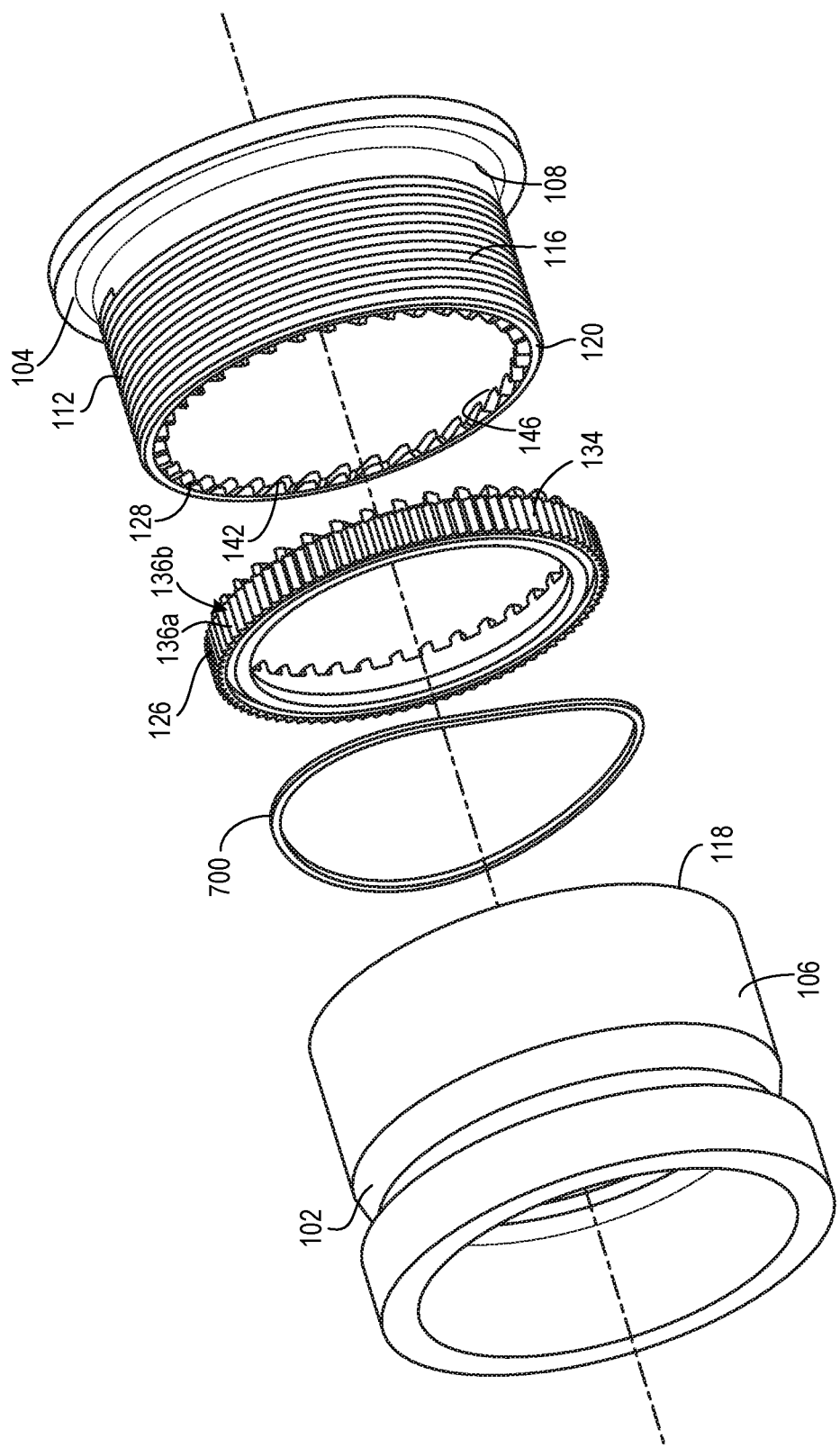
FIG. 4 illustrates an exploded perspective view of the threaded components, showing the spring element and a first ratchet interface, which are disposed within a first threaded component upon assembly.
Figure 5B:
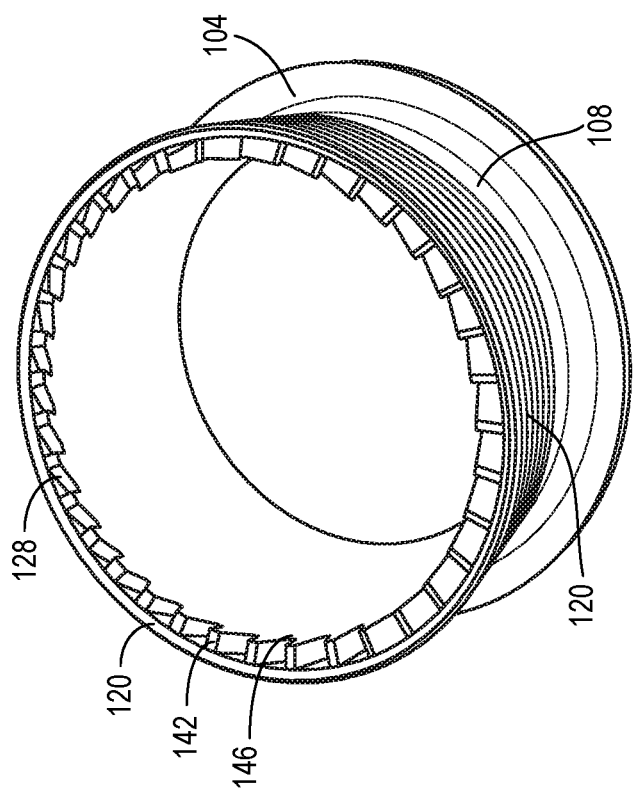
FIG. 5B illustrates an axial perspective view of the second threaded component.
Figure 5A:
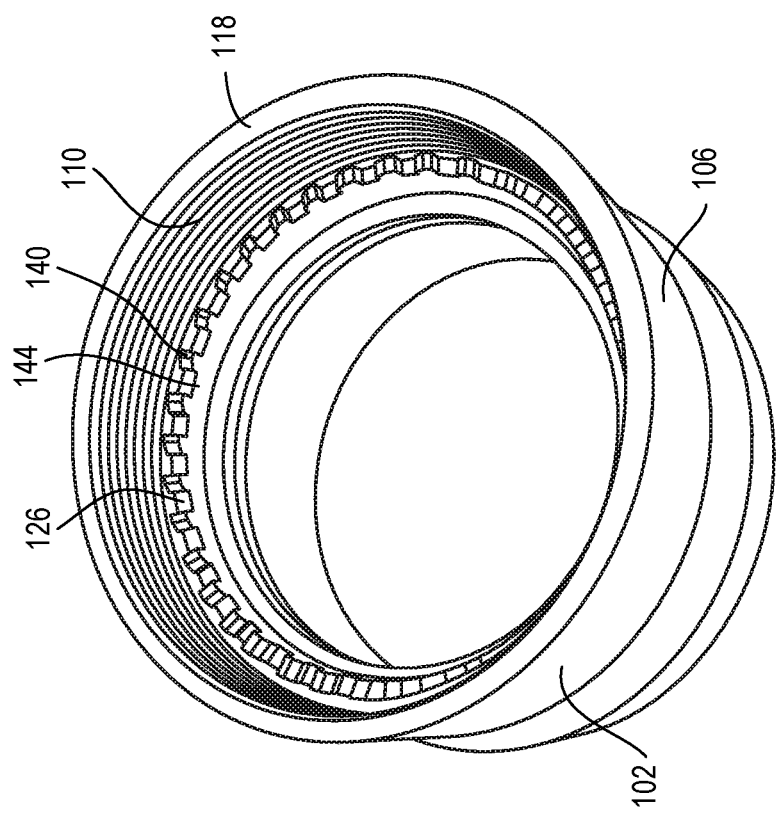
FIG. 5A illustrates an axial perspective view of the first threaded component.
Figure 6:
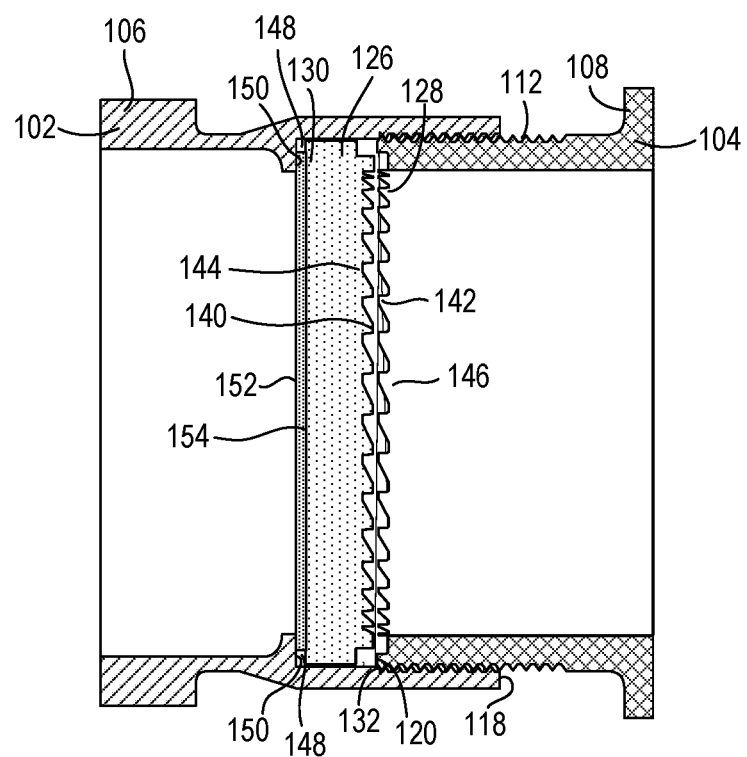
FIG. 6 illustrates a partial cross-sectional view of the threaded components threadingly engaged, with the spring element compressed to separate the ratchet interfaces, in order to allow the threaded components to loosen.
Figure 12:
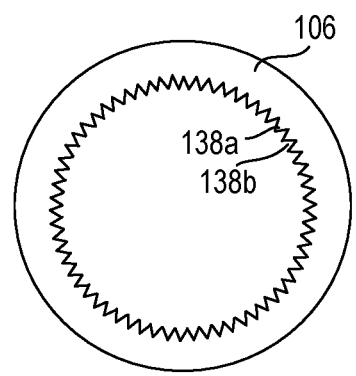
FIG. 12 illustrates an axial cross-sectional view of an inner surface of a body of the first threaded component having a spline/groove configuration sized to engage with a spline/groove configuration of the first ratchet interface.

Turning to the Figures, FIGS. 1A-3B show various relative positions of a pair of threaded components of a system, including a first threaded component 102 and a second threaded component 104 configured to threadingly engage with each other, in order to become interlocked or fastened to each other. FIGS. 1A and 1B show the threaded components 102, 104 physically separated from each other. FIGS. 2A and 2B show the threaded components 102, 104 initially engaged with each other. FIGS. 3A, 3B show the threaded components 102, 104 engaged after relative rotation, and with ratchet interfaces 126, 128 of the anti-rotation device engaged. FIG. 4 shows an exploded perspective view of the threaded components 102, 104, illustrating one embodiment of the first ratchet interface 126 and a spring element 130, which are located within the first threaded component 102 upon assembly. FIGS. 5A, 5B show axially views of the first and second threaded components 102, 104 separated from each other. FIG. 6 shows the anti-rotation device disengaged to allow the threaded components 102, 104 to be loosened or separated. FIGS. 7-11 show various example configurations of the spring element 130. FIG. 12 shows an example spline/groove configuration of the first threaded component 102 that engages with an example spline/groove configuration of the first ratchet interface 128 shown in FIG. 4. Hereafter, reference is made generally to the Figures where a described feature is generally illustrated in the Figures, or to a particular Figure or Figures that best illustrate a feature being described.

In further detail, the first and second threaded components 102, 104 each include a respective body 106, 108, and each body 106, 108 includes an associated threaded portion 110, 112. Each threaded portion 110, 112 includes and/or is defined by an associated thread or groove that helically extends in a respective inner or outer surface of a respective body 106, 108. The helical threads of the threaded portions 110, 112 are sized complimentary to each other so that the threaded portions 110, 112 can engage and interlock with each other upon relative rotation of the first and second threaded components 102, 104, such that the relative rotation causes relative axial movement of the threaded components 102, 104. As shown in the Figures, the threaded portion 110 of the first component 104 is disposed on an inner surface 114 of the body 106, and the threaded portion 112 of the second component 104 is disposed on an outer surface 116 of the body 108. The configuration of the threaded portions 110, 112 illustrated in the drawings is merely an example, and any of various other types of configurations, including other numbers of rotations or dimensions for the helical threads may be possible.

Also, the threaded portions 110, 112 each include a respective mating end 118, 120. To fasten or interlock the threaded components 102, 104 together, the mating ends 118, 120 are brought into contact with each other. Upon contact, one of the threaded components 102, 104 is rotated relative to the other of the threaded components 102, 104 in a tightening direction (either clockwise or counter-clockwise), which axially moves the threaded components 102, 104 closer together, and increases the surface area amounts of the threaded portions 110, 112 that are in contact and/or engaged with each other. Relative rotation of the threaded components 102, 104 in the tightening direction increases an amount of interlock or fastening between the threaded components 102, 104 by increasing the numbers of rotations of the helical grooves in contact with the others' surfaces, and/or by increasing the number of counter rotations in a loosening direction needed to separate the threaded components 102, 104. Also, at least for the configuration shown in the Figures, as the threaded components 102, 104 are relatively rotated in the tightening direction, an amount of the first threaded component 102 that covers the second threaded component 104 increases.

In addition, after the threaded components 102, 104 are interlocked or fastened together, the interlock between the threaded components 102, 104 may be decreased, loosened, or weakened, and/or the threaded components 102, 104 can be separated altogether, through relative rotation of the threaded components 102, 104 in a loosening direction (either clockwise or counter-clockwise) that is the opposite to the tightening direction. Relative rotation of the threaded components 102, 104 in the loosening direction decreases an amount of interlock or fastening between the threaded components by decreasing the numbers of rotations of the helical grooves in contact with the others' surfaces, and/or by decreasing the number of rotations in the loosening direction needed to separate the threaded components 102, 104 from each other. Also, at least for the configuration in the Figures, as the threaded components 102, 104 are relatively rotated in the loosening direction, an amount of the first threaded component 102 that covers the second threaded component 104 decreases.

Additionally, as shown in the Figures, the bodies 106, 108 are each generally cylindrical structures, at least over the threaded portions 110, 112, in order to permit the threaded engagement between the threaded components 102, 104. Other than the threaded portions 110, 112, the bodies 106, 108 may have any of various structures or shapes, which may depend on the function of the threaded components 102, 104, and/or the application or system in which the threaded components 102, 104 are implemented.

Also, the Figures show the bodies 106, 108 as each being hollow structures, where each body 106, 108 has an inner surface defining a bore 122, 124 axially extending through a respective one of the bodies 106, 108. In other example configurations, the second threaded component 104 may be a substantially solid structure, such that it does not have an inner surface defining a bore extending therethrough. In addition or alternatively, the bore 122 of the first threaded component 102, may not axially extend all the way through the body 106 as shown in the Figures, but instead may extend only partially through the body 106. For example, the bore 122 may axially extend over the cross-section of the body 106 that includes the first threaded portion 110, but at least part of the body 106 that does not include the threaded portion 110 may be a solid structure that does not include a part of the bore 122. Various solid and hollow configurations for the first and second threaded components 102, 104 may be possible.

In addition, the Figures show the threaded components 102, 104 alone or in isolation. However, in various applications, the threaded components 102, 104 may be part of a larger system. For example, one or both of the threaded components 102, 104 may be coupled to another part of the larger system. At some point during assembly or operation of the larger system, the threaded components 102, 104 are engaged and relatively rotated in the tightening direction, in turn, interlocking or fastening the threaded components 102, 104 together. The larger system, during operation, may experience certain movements, such as shaking, vibration, or oscillation. If the bodies 106, 108 were the elements of the system 100 keeping the threaded components 102, 104 fastened together, such movement may cause the threaded components 102, 104 to relatively rotate in the loosening direction, undesirably weakening the connection between the threaded components 102, 104, and/or causing the threaded components 102, 104 to separate altogether.

To prevent the threaded components 102, 104 from loosening (i.e., relatively rotating in the loosening direction) despite being subjected to such movement, the system 100 may include (e.g., the threaded components 102, 104 may be integrated with) an anti-rotation device that prevents the threaded components 102, 104 from relatively rotating in the loosening direction. The anti-rotation device may be configured in one of two states at a given point in time, including an engaged state and a disengaged state. In the engaged state, the anti-rotation device is configured to exert an anti-loosening resistance to relative rotation of the threaded components 102, 104 in the loosening direction that is greater than an anti-tightening resistance it exerts to relative rotation of the threaded components 102, 104 in a tightening direction. The anti-loosening resistance may be greater than a maximum rotational force in the loosening direction that the threaded components 102, 104 would be subjected to due to movement in the larger system, thereby preventing undesired loosening of the threaded components 102, 104. In the disengaged state, the anti-rotation device does not exert an anti-loosening or an anti-tightening resistance to relative rotation of the threaded components 102, 104.

In the example configuration shown in the Figures, the anti-rotation device includes a first ratchet interface 126, a second ratchet interface 128, and a spring element 130. In general, as used herein, a ratchet interface is a structure that, when engaged or in contact with another structure, provides greater resistance to relative movement with the other structure in a first direction than a resistance it provides to relative movement with the other structure in a second direction that is opposite the first direction. In the example configuration shown in the figures, the first and second ratchet interfaces 126, 128 are each round or circular structures, and the other structure to which each of the interfaces 126, 128 contacts or engages is the other ratchet interface 126, 128. For such ratchet interfaces 126, 128, the relative movement is relative rotational movement, where one of the ratchet interfaces 126, 128 rotates relative to the other of the ratchet interfaces 126, 128.

When the ratchet interfaces 126, 128 are engaged or in contact with each other, illustrated in FIG. 3B, the anti-rotation device, as a whole, is in the engaged state. Additionally, when engaged, the ratchet interfaces 126, 128 provide an anti-loosening resistance to relative rotational movement in the loosening direction that is greater than an anti-tightening resistance it provides to relative rotational movement in the tightening direction. In some example configurations, the anti-tightening direction is zero, substantially zero, or negligible, such that the anti-rotation device in the engaged state does not significantly impede relative rotation of the threaded components 102, 104 in the tightening direction. As mentioned, the anti-loosening resistance provided by the engaged ratchet interfaces 126, 128 is larger than a maximum rotational force in the loosening direction exerted on the threaded components 102, 104 when the larger system is in operation, such that the engaged ratchet interfaces 126, 128 would not relatively rotate in the loosening direction while the larger system is in operation. Accordingly, the engaged ratchet interfaces 126, 128, when in contact with each other, effectively prevent the threaded components 102, 104 (including their bodies 106, 108) from relatively rotating in the loosening direction and weakening their connection.

The second ratchet interface 128 may be considered a part of or an element of the second threaded component 104. In some example configurations, the second ratchet interface 128 may be integral with the body 108 of the second component 104, such as by being formed from the same material, and/or by using the same mold or cast in the same manufacturing process as the second body 108. In other example configurations, the second ratchet interface 128 may be manufactured separate from the second body 108, and subsequently affixed or adhered to the body 108. Various ways of integrating the second ratchet interface 128 with the rest of the second threaded component 104 may be possible.

Additionally, in the example configurations shown in the Figures, the second ratchet interface 128 is disposed at the mating end 120 of the second threaded portion 112. In other example configurations, the second ratchet interface 128 may be recessed from the mating end 128, or otherwise disposed within the second body 108 a certain axial distance away from the mating end 120.

Also, as shown in the Figures, the first ratchet interface 126 and the spring element 130 are disposed within the body 106 of the first threaded component 102. In particular, the first ratchet interface 126 and the spring element 130 are recessed or disposed within the body 106 away from the mating end 118, and positioned adjacent to a second end 132, opposite the mating end 118, of the first threaded portion 110. As described in further detail below, and as shown in FIGS. 1B, 2B, and 5A, the first ratchet interface is configured to axially move in the bore 122 dependent on axial movement of the spring element 130. Depending on this movement, at a given point in time, at least a portion of the first ratchet interface 126 may be disposed in the bore 122 over a same cross-section, perpendicular to axis A, as a part of the first threaded portion 110.

In addition, in the example configurations illustrated in the Figures (best shown in FIGS. 4 and 5A), the first ratchet interface 126 is a ring, or a ring-like structure. In other example configurations, the ratchet interface 126 may be disc-shaped (e.g., not centrally hollow like a ring), or may be any other of various shapes suitable for insertion, disposal, and axial movement within the body 106.

Additionally, for the example configurations shown in the Figures (best illustrated in FIG. 4), an outer surface 134 of the first ratchet interface 126 includes a set of circumferentially oriented splines or ribs 136a and corresponding grooves 136b defined by adjacent ribs 126a that are configured or sized to engage or interlock with a corresponding set of circumferentially oriented splines or ribs 138a and grooves 138b disposed within the body 106. An example configuration of the ribs 138a, 138b for engagement with the ribs 136a, 136b in FIG. 4 is shown in FIG. 12. The splines 136a, 138a and grooves 136b, 138b interlock with each other to permit the first ratchet interface 126 to axially move in a bidirectional manner relative to the body 106, but prevent relative rotational movement between the body 106 and the first ratchet interface 126. Accordingly, if the body 106 is rotated, the first ratchet interface 126 rotates along with the rotation of the body 106. The particular spline/ groove configuration shown in FIGS. 4 and 12 is merely an example, and other spline/groove configurations that permit relative axial movement while preventing relative rotational movement between the body 106 and the first ratchet interface 126 may be possible. For example, the spines 136*a*, 138*a*, and/or the grooves 136*b*, 138*b* may be flat or rounded in shape, rather than sharp or pointed as illustrated in FIGS. 4 and 12. In addition or alternatively, more or fewer splines and grooves than the number shown in FIGS. 4 and 12 may be possible.

Configurations, alternative to or in addition to a spline/ groove configuration, may also be possible. For example, the first ratchet interface 126 may be fixedly coupled to the body 106 by way of the spring element 106. In such configurations, the fixed coupling between the first ratchet interface 126, the spring element 130, and the body 106 would cause the first ratchet interface 126 and the spring element 130 to rotate along with the body 106, while the not preventing axial movement of the spring element 130 and the first ratchet interface 126 relative to the body 106. Various configurations may be possible.

In addition, the first and second ratchet interfaces 126, 128 each include engagement elements and/or surfaces that are configured to engage with or contact each other in order for the anti-rotation device to be engaged and provide greater resistance to relative rotation in the loosening direction than to relative rotation in the tightening direction. In the example configurations shown in the Figures, the engagement elements are sets of teeth 140, 142, also referred to as locking teeth or interlocking teeth. The teeth in each set 140, 142 are circularly or circumferentially disposed, and correspondingly sized and oriented to allow for the two sets 140, 142 to engage and interlock.

As shown in the Figures, the first and second sets of teeth 140, 142 axially face each other when the first and second threaded components 102, 104 are engaged with each other. Additionally, the teeth of the first set 140 each axially extend from a respective base or support structure 144, 146 toward the other set. Further, each set 140, 142 may have an associated ratchet contour—formed by a combination of the individual contours of the teeth of a set and the contours of the portions of the base in between the teeth—that provides greater resistance to relative rotation in the loosening direction than to relative rotation in the tightening direction. For the example configurations shown in the Figures, the ratchet contour is a sawtooth contour, although other similar or functionally equivalent contours may be possible.

In accordance with a sawtooth contour, each tooth includes two surfaces extending from an associated base 144, 146, including a first surface and a second surface. The first surface of the tooth axially extends from an associated base 144, 146 at an inclination angle relative to the associated base 144, 146 (e.g., the first surface "ramps up" from the base) to a point (e.g., a sharp point, a flat point, or a rounded point as non-limiting examples) where it meets the second surface of the tooth. The second surface axially extends from the point to the associated base 144, 146 "more steeply" than the first surface "ramps up"—i.e., an angle that the second surface forms with the associated base 144, 146 is greater than the inclination angle.

Further, adjacent teeth of a given set define a space between them. The teeth of the two sets are sized such that when the two sets 140, 142 are engaged with each other, for each of the sets 140, 142, each tooth of one set is disposed or positioned in one of the spaces defined by the other set 140, 142, forming an interlock between the two sets 140, 142, or more generally between the first and second ratchet interfaces 126, 128. During relative rotation of the first and second interfaces 126, 128 in the tightening direction, the first surfaces of the teeth move over each other, causing the first and second ratchet interfaces 126, 128 to axially separate from each other by an axial distance about equal to axial heights of the teeth extending from the teeth points to the respective bases 144, 146. Assuming that relative rotation between the ratchet interfaces 126, 128 occurs while they are subjected to an axial force bringing the ratchet interfaces 126, 128 together, then after the points of the teeth of one set rotate past corresponding points of the teeth of the other set, the axial force will bring the teeth into next spaces in the rotation. From the perspective that one of the ratchet interfaces 126, 128 is rotating while the other is stationary, the ratchet interface that is rotating also axially moves depending on its rotation over the stationary ratchet interface's ratchet contour.

Additionally, when the ratchet interfaces 126, 128 are engaged, the second surfaces of the teeth will prevent relative rotation in the loosening direction. In this way, the resistance that the teeth provide to relative rotation in the loosening direction is greater than the resistance it provides to relative rotation in the tightening direction.

Additionally, as shown in the Figures, the first ratchet interface 126 is disposed axially closer to the first threaded portion 110 (including the mating end 118 and the second end 132) than the spring element 130. In general, the spring element 130 can be any structure having a variable dimension that extends from a minimum amount to a maximum amount, and that is movable in a bidirectional manner between the minimum and maximum dimension amounts. A current amount of the variable dimension at a given point in time may be a distance between opposing ends of the spring element 130, where the distance is aligned with the bidirectional movement of the spring element 130. Additionally, the spring element 130 is referred to as being in an expanded state when its dimension is at the maximum amount, and is referred to as being in a contracted state when its dimension is at the minimum amount. Accordingly, the spring element 130 is movable between its expanded and contracted states.

In the example embodiments shown in the Figures, the spring element 130 is disposed and movable in an annular space or gap 148 within the body 106 of the first threaded component 102. Within the first threaded component 102, the spring element 130 is axially movable in a bidirectional manner within the annular space 148, and the variable dimension of the spring element 130 that changes is referred to as the axial dimension or axial length. In addition, the spring element 130 engages with, is adjacent to, abuts, contacts, positioned against, and/or is supported by an inner shoulder 150 of the body 106 of the first threaded component 102. Accordingly, the spring element 130 axially extends from a first end 152 to a second end 154. The first axial end 152 abuts the shoulder 150, and the second end 154 abuts, contacts, and/or engages with the first ratchet interface 126.

Through this configuration, axial movement of the spring element 130 is defined by axial movement of the second end 154 relative to the first end 152. The second end 154 axially moves in an expanding direction when it axially moves away from inner shoulder 150 (and/or away from the first end 152) and toward the mating end 118. In addition, the second end 154 axially moves in a contracting direction when it axially moves toward the inner shoulder 150 (and/or toward the first end 152) and away from the mating end 118.

Additionally, when unbiased, the spring element 130 is at its maximum axial length in the expanded state, or the second end 154 is axially moving in the expanding direction. Also, the spring element 130 exerts a predetermined axial force in the expanding direction. If the spring element 130 is in the expanded state, and the second end 154 is biased with an axial force in the contracting direction that is less than the predetermined axial force, then the spring element 130 is maintained in the expanded state. However, if the axial force in the contracting direction is greater than the predetermined axial force, then the spring element 130 moves from the expanded state toward the contracted state, i.e., the second end 154 moves in the contracting direction toward the inner shoulder 150 and the first end 152, until the spring element 130 is in the contracted state.

In addition, if the spring element 130 is in the contracted state, or a state in between the expanded and contracted states, and the second end 154 is biased with an axial force in the contracting direction that is less than the predetermined axial force, then the second end 154 moves in the expanding direction toward the mating end 118. However, if the axial force in the contracting direction is greater than the predetermined axial force, then the spring element 130 is maintained in the contracted state if it is already in the contracted state, or the second end 154 moves in the contracting direction toward the inner shoulder 150 and the first end 152, until the spring element 130 is in the contracted state if the spring element 130 is in between the contracted and expanded states.

By engaging or contacting the first ratchet interface 126, the spring element 130 constantly biases the first ratchet interface 126 with the predetermined axial force in the expanding direction toward the mating end 118. At the same time, the second end 154 of the spring element 130 may be externally biased by way of the first ratchet interface 126, which may be biased by an opposing axial force in the contracting direction. Accordingly, the spring element 130 controls the axial positioning of the first ratchet interface 126 dependent on the predetermined axial force in the expanding direction relative to any axial force in the contracting direction exerted on the first ratchet interface 126.

The spring element 130 may have any of various configurations, non-examples of which are shown in FIGS. 7-11. FIG. 7 shows the spring element 130 configured as a wave spring 700. FIG. 8 shows the spring element 130 configured as a single coil spring 800. FIG. 9 shows the spring element 130 configured as a plurality of coil springs 900, each circumferentially disposed about the inner shoulder 150. FIG. 9 shows the four coil springs 900, although other numbers coil springs more or less than four may be possible. FIG. 10 shows the spring element 130 configured as a Belleville washer 1000. FIG. 11 shows the spring element 130 configured as a plurality of elastic or compliant fingers 1100 circumferentially disposed about and extending from a surface of the first ratchet interface that is opposite the surface that engages with the second ratchet interface 128. FIG. 11 shows three fingers 1100, although other numbers of fingers more or less than three may be possible.

Prior to fastening or interlocking the first and second threaded components 102, 104 with the anti-rotation device, the first and second threaded components 102, 104 may be initially separated from each other, as illustrated in FIGS. 1A, 1B, and 5. While separated, the spring element 130 is at an initial, maximum axial length (shown in FIG. 1B), and biasing the first ratchet interface 126 away from the inner shoulder 150 in the expanding direction.

To fasten or interlock the first and second threaded components 102, 104 together, the mating ends 118, 120 may be moved into contact with each other and engaged, as shown in FIGS. 2A, 2B. Upon engagement, the first and second threaded components 102, 104 are relatively rotated in the tightening direction, such as by rotating the first threaded component 102 relative to the second threaded component 104, or by rotating the second threaded component 104 relative to the first threaded component 102. As the threaded components 102, 104 continue to relatively rotate, they increase their threaded engagement by increasing a number of threads interlocked together and/or an amount of surface area of the threaded portions 110, 112 engaged with each other. A suitable tool configured to grip the outer surface of the first threaded component 102 or the second threaded component 104 may be used to relatively rotate the first and second threaded components 102, 104 through application of torque. As the first and second threaded components 102, 104 relatively rotate in the tightening direction, they move axially closer together, in that the second threaded portion 112 continuously axially moves within the bore 122 of the first body 106.

Upon initial engagement of the mating ends 118, 120, the first and second ratchet interfaces 126, 128 face each other, and are axially spaced apart from each other, as shown in FIGS. 2A, 2B. As the threaded components 102, 104 relatively rotate in the tightening direction, the first and second ratchet interfaces 126, 128 eventually engage with and/or contact each other. For example, the sets of teeth 140, 142 engage with each other, as shown in the FIG. 3B. Upon initial engagement and/or contact of the first and second ratchet interfaces 126, 128, the first and second threaded components 102, 104 may continue to relatively rotate in the tightening direction, increasing their threaded engagement, and causing the engaging ratchet interfaces 126, 128 to correspondingly relatively rotate in the tightening direction. During the relative rotation of the threaded components 102, 104, the spring element 130 continuously axially biases or presses the first ratchet interface 126 in the expanding direction against the second ratchet interface 128. However, the predetermined force with which the spring element 130 exerts the bias is less than a counter force that the second ratchet interface 128 exerts on the first ratchet interface 126 in the contracting direction.

Accordingly, as the first and second threaded components 102, 104 continue to relatively rotate in the tightening direction, the spring element 130 and the first ratchet interface 126 axially move based on a combination of factors. First, the axial movement of second threaded portion 112 and the second ratchet interface 128 within the bore 122 due to the relative rotation of the first and second threaded components 102, 104, axially moves the first ratchet interface 126 the second end 154 of the spring element 130 in the contracting direction toward the inner shoulder 150 and the first end 152 of the spring element 130, which compresses the spring 130. In addition, the relative rotation of the first and second ratchet interfaces 126, 128 causes the first ratchet interface 126 and the spring element 130 to axially move according to the ratchet contours of the first and second ratchet interfaces 126, 128. For example, as the inclined first surfaces of the teeth 140, 142 slide over each other due to the relative rotation, the first ratchet interface 126 and the second spring element end 154 may axially move in the contracting direction. Then, once the points of the teeth 140, 142 rotate past each other, the biasing from the spring element 130 may move (e.g., push) the teeth 140, 142 in the expanding direction and into next spaces defined by the teeth 140, 142 due to the rotation. That pattern of movement, which may be considered an oscillating, sawtooth, or wave-like movement, in an axial bidirectional manner, due to the ratchet (e.g., sawtooth) contours may repeat as the first and second threaded portions 102, 104 continue to relatively rotate while the first and second ratchet interfaces 126, 128 are engaged with each other. FIG. 3B shows that after sufficient relative rotation of the first and second threaded components 102, 104, the ratchet interfaces 126, 128 are engaged and the spring element 130 has contracted such that it has a shorter axial length than its initial axial length prior to engagement between the ratchet interfaces 126, 128.

At some point, relative rotation of the first and second threaded components 102, 104 may stop, at which point the anti-rotation device is engaged, with the first and second ratchet interfaces engaged with each other, and the sets of teeth 140, 142 being interlocked together, such as is shown in FIGS. 3A, 3B. During operation of the larger system, should movement, such as vibration or shaking, bias the threaded components 102, 104 to loosen the interlock between them, the engaged anti-rotation device will resist the movement, and prevent the threaded components 102, 104 from relatively rotating in the loosening direction. For example, as previously described, the second surfaces of the teeth from the different sets 140, 142 may be in contact with each other to prevent the relative rotation in the loosening direction.

Additionally, at least during some methods of operation, relative rotation of the first and second threaded components 102, 104 may stop at a certain point, such that an axial length of the spring element 130 is larger than an axial height of the teeth 140, 142 (determined axially from the bases 144, 146 to the points of the teeth). As shown in FIG. 6, in the event that it is desired to detach or separate the threaded components 102, 104 from each other, the spring element 130 may be further compressed or contracted, such as to its contracted state, in turn moving the first ratchet interface 126 in the contracting direction and axially separating the first and second ratchet interfaces 126, 128 from each other. Doing so will configure the anti-rotation device in its disengaged state. With the first ratchet interface 126 pulled away from the second ratchet interface 128, the first and second threaded components 102, 104 may be relatively rotated in the loosening direction, allowing the first and second components 102, 104 to eventually separate or remove their interlock from each other. For at least some example configurations, a tool (not shown) may be inserted through the bore 122 from a non-engaging end 156 of the first body 106, and connected to the spring element 130 and/or the first ratchet interface 126, and then retracted to compress the spring element 130 and pull the first ratchet interface 126 away from the second ratchet interface 128.

Accordingly, the above-described anti-rotation device, integrated with the first and second threaded components 102, 104, improves the fastening or interlock between the first and second threaded components 102, 104 by resisting or preventing undesirable loosening between the threaded components 102, 104, such as when implemented in a larger system that is subjected to various types of movement, such as vibration, shaking, or oscillation. In addition, the anti-rotation device becomes engaged (e.g., transitions from disengaged to engaged) wholly within the threaded components 102, 104, thus effectively operating without the need for external visual access to the anti-rotation device or visual confirmation that the anti-rotation device is engaged. A person or machine fastening the first and second threaded components 102, 104 together may know beforehand a predetermined, minimum amount of relative rotations between the threaded components 102, 104, and/or a relative axial positioning between the threaded components 102, 104, that are needed to cause the anti-rotation device to become engaged. In addition or alternatively, relative rotation of the ratchet interfaces 126, 128 when they are engaged may cause an audible sound, such as a "clicking" sound. A user or machine may listen for an initial clicking sound to know when the ratchet interfaces 126, 128 initially engage, and/or a number of clicks to determine when to stop the relative rotation between the threaded components 102, 104. In any of the situations, the person or machine does not need to visually see within the threaded components 102, 104 to confirm the engagement of the anti-rotation device.

Also, the anti-rotation device becomes engaged as part of or during the relative rotation of the first and second threaded components 102, 104. That is, once relative rotation of the threaded components 102, 104 to fasten them together is finished, the anti-rotation device is simultaneously or automatically engaged. An additional assembly step occurring after, or otherwise separate from, the relative rotation of the threaded components 102, 104 is not needed to engage the anti-rotation device within the threaded components 102, 104. In addition, the anti-rotation device does not experience performance degradation at higher temperatures that an elastomeric insert, for example, would. Also, the described anti-rotation device does not have the usability or life cycle limitations that a deformed thread would, since the anti-rotation device engages without having to deform the threads of the first and/or second threaded components 102, 104.

While various embodiments have been described, it will be apparent to those of ordinary skill in the art that many more embodiments and implementations are possible. Accordingly, the embodiments described herein are examples, not the only possible embodiments and implementations.

The subject matter of the disclosure may also relate, among others, to the following aspects:

A first aspect relates to a system comprising: a first threaded component comprising: a first threaded portion, and a first ratchet interface movably disposed within a body of the first threaded component; a second threaded component comprising: a second threaded portion configured to form a threaded engagement with the first threaded portion, and a second ratchet interface configured to engage with the first ratchet interface when the second threaded portion is threadingly engaged with the first threaded portion; and a spring element disposed within the body of the first threaded component, the spring element configured to bias the first ratchet interface against the second ratchet interface when the first and second ratchet interfaces are engaged and the first and second threaded components are increasing the threaded engagement.

A second aspect relates to a method comprising: relatively rotating a first threaded component and a second threaded component in a tightening direction; while relatively rotating the first and second threaded components, engaging a first ratchet interface disposed within a body of the first threaded component with a second ratchet interface disposed at a mating end of the second threaded component; and while engaged, relatively rotating the first and second ratchet interfaces and continuing to relatively rotate the first and second threaded components in the tightening direction.

A third aspect relates to a system comprising: a pair of threadingly engaged components; and an anti-rotation device disposed within the pair of threadingly engaged components, the anti-rotation device comprising: a pair of ratchet interfaces each comprising a set of teeth interlocked with each other; and a spring element biasing one of the ratchet interfaces against the other of the ratchet interfaces.

In some aspects, the first threaded portion is disposed on an inner surface of the first threaded component, and the second threaded portion is disposed on an outer surface of the second threaded component.

In some aspects, the first ratchet interface and the second ratchet interface each comprise a respective set of circumferentially oriented teeth.

In some aspects, the teeth each comprise a sawtooth shape.

In some aspects, the first threaded component comprises an internal annular space, and the spring element is configured to axially move in the internal annular space.

In some aspects, when the first and second threaded components are threadingly engaged and rotated relative to each other, and when the first and second ratchet interfaces are engaged, the spring element is configured to axially move depending on a ratchet contour of the second ratchet interface.

In some aspects, the spring element comprises a wave spring.

In some aspects, the spring element comprises a Belleville washer.

In some aspects, the spring element comprises a single coil spring.

In some aspects, the spring element comprises a plurality of coil springs circumferentially disposed about an internal annular shoulder of the first threaded component.

In some aspects, the spring element comprises a plurality of fingers extending from the first ratchet interface.

In some aspects, the first and second threaded components each have hollow bodies.

In some aspects, an outer surface of the first ratchet interface comprises a plurality of splines configured to engage with a plurality of grooves of an inner surface of the first threaded component, the plurality of splines and the plurality of grooves sized to permit relative axial movement between the first ratchet interface and the body of the first threaded component, while preventing relative rotational movement between the ring and the second cylindrical structure.

In some aspects, a threaded portion of the second threaded component moves in an axial direction within the body of the first threaded component in response to relatively rotating the first and second threaded components in the tightening direction; and the first ratchet interface moves within the body in the axial direction while relatively rotating the first and second ratchet interfaces and the first and second threaded components in the tightening direction.

In some aspects, the first ratchet interface axially moves in a bidirectional manner dependent on ratchet contours of the first and second ratchet interfaces rotationally moving other each other during relative rotation of the first and second ratchet interfaces.

In some aspects, after relatively rotating the first and second threaded components in the tightening direction, the first and second ratchet interfaces axially separate; and upon axially separating the first and second ratchet interfaces, the first and second threaded components relatively rotate in a loosening direction.

In some aspects, the spring element comprises an axial length that is longer than an axial height of the teeth.

In addition to the features mentioned in each of the independent aspects enumerated above, some examples may show, alone or in combination, the optional features mentioned in the dependent aspects and/or as disclosed in the description above and shown in the figures.

What is claimed is:
1. A system comprising:
 a first threaded component comprising:
  a first threaded portion; and
  a first ratchet interface movably disposed within a body of the first threaded component;
 a second threaded component comprising:
  a second threaded portion configured to form a threaded engagement with the first threaded portion; and
  a second ratchet interface configured to engage with the first ratchet interface when the second threaded portion is threadingly engaged with the first threaded portion; and
 a spring element disposed within the body of the first threaded component, the spring element configured to bias the first ratchet interface against the second ratchet interface when the first and second ratchet interfaces are engaged and the first and second threaded components are increasing the threaded engagement.

2. The apparatus of claim 1, wherein the first threaded portion is disposed on an inner surface of the first threaded component, and the second threaded portion is disposed on an outer surface of the second threaded component.

3. The apparatus of claim 1, wherein the first ratchet interface and the second ratchet interface each comprise a respective set of circumferentially oriented teeth.

4. The apparatus of claim 3, wherein the teeth each comprise a sawtooth shape.

5. The apparatus of claim 1, wherein the first threaded component comprises an internal annular space, the spring element configured to axially move in the internal annular space.

6. The apparatus of claim 5, wherein when the first and second threaded components are threadingly engaged and rotated relative to each other, and when the first and second ratchet interfaces are engaged, the spring element is configured to axially move depending on a ratchet contour of the second ratchet interface.

7. The apparatus of claim 1, wherein the spring element comprises a wave spring.

8. The apparatus of claim 1, wherein the spring element comprises a Belleville washer.

9. The apparatus of claim 1, wherein the spring element comprises a single coil spring.

10. The apparatus of claim 1, wherein the spring element comprises a plurality of coil springs circumferentially disposed about an internal annular shoulder of the first threaded component.

11. The apparatus of claim 1, wherein the spring element comprises a plurality of fingers extending from the first ratchet interface.

12. The apparatus of claim 1, wherein the first and second threaded components each have hollow bodies.

13. The apparatus of claim 1, wherein an outer surface of the first ratchet interface comprises a plurality of splines configured to engage with a plurality of grooves of an inner surface of the first threaded component, the plurality of splines and the plurality of grooves sized to permit relative axial movement between the first ratchet interface and the body of the first threaded component, while preventing relative rotational movement between the ring and the second cylindrical structure first ratchet interface and the first threaded component.

14. A method comprising:
relatively rotating a first threaded component and a second threaded component in a tightening direction;
while relatively rotating the first and second threaded components, engaging a first ratchet interface disposed within a body of the first threaded component with a second ratchet interface disposed at a mating end of the second threaded component; and
while engaged, relatively rotating the first and second ratchet interfaces and continuing to relatively rotate the first and second threaded components in the tightening direction.

15. The method of claim 14, further comprising:
moving a threaded portion of the second threaded component in an axial direction within the body of the first threaded component in response to relatively rotating the first and second threaded components in the tightening direction; and
moving the first ratchet interface within the body of the first threaded component in the axial direction while relatively rotating the first and second ratchet interfaces and the first and second threaded components in the tightening direction.

16. The method of claim 15, wherein moving the first ratchet interface further comprises axially moving the first ratchet interface in a bidirectional manner dependent on ratchet contours of the first and second ratchet interfaces rotationally moving each other during relative rotation of the first and second ratchet interfaces.

17. The method of claim 16, wherein the ratchet contours are each a sawtooth contour.

18. The method of claim 14, further comprising:
after relatively rotating the first and second threaded components in the tightening direction, axially separating the first and second ratchet interfaces; and
upon axially separating the first and second ratchet interfaces, relatively rotating the first and second threaded components in a loosening direction.

\* \* \* \* \*